United States Patent
Zhu et al.

(10) Patent No.: US 12,013,919 B2
(45) Date of Patent: Jun. 18, 2024

(54) METHOD FOR CLASSIFYING A TRACKED OBJECT

(71) Applicant: Aptiv Technologies AG, Schaffhausen (CH)

(72) Inventors: Weimeng Zhu, Wuppertal (DE); Florian Kaestner, Bochum (DE); Zhiheng Niu, Wuppertal (DE); Arne Grumpe, Essen (DE)

(73) Assignee: Aptiv Technologies AG, Schaffhausen (CH)

(*) Notice: Subject to any disclaimer, the term of this patent is extended or adjusted under 35 U.S.C. 154(b) by 365 days.

(21) Appl. No.: 17/643,586

(22) Filed: Dec. 9, 2021

(65) Prior Publication Data

US 2022/0188582 A1     Jun. 16, 2022

(30) Foreign Application Priority Data

Dec. 10, 2020 (EP) .................... 20212928

(51) Int. Cl.
  *G06F 18/25* (2023.01)
  *G01S 13/88* (2006.01)
  *G06N 3/04* (2023.01)

(52) U.S. Cl.
  CPC ............ *G06F 18/254* (2023.01); *G01S 13/88* (2013.01); *G06N 3/04* (2013.01)

(58) Field of Classification Search
  CPC .. G06F 18/254; G06F 18/253; G06F 18/2414; G01S 13/88; G01S 7/417; G01S 13/931; G01S 13/726; G01S 13/08; G01S 13/58; G01S 13/865; G01S 13/867; G01S 17/931; G01S 13/89; G01S 7/415;
  (Continued)

(56) References Cited

U.S. PATENT DOCUMENTS 10,732,261 B1    8/2020  Wang et al.
11,260,852 B2 *  3/2022  Rahimi ................. G06N 3/044
(Continued)

OTHER PUBLICATIONS

"Scene Understanding With Automotive Radar"; Ole Schumann, IEEE Transactions on Intelligent Vehicles (vol. 5, Issue: 2, pp. 188-203) (Year: 2020).*
(Continued)

*Primary Examiner* — Michael S Osinski
(74) *Attorney, Agent, or Firm* — Harness, Dickey & Pierce, P.L.C.

(57) ABSTRACT

A method is provided for classifying a tracked object in an environment of a vehicle. The vehicle includes a plurality of radar sensors and a processing device configured to establish a neural network. According to the method, local radar detections are captured from an object in the environment of the vehicle via the radar sensors. Based on the local radar detections, point features and tracker features are determined. The point features are encoded via point encoding layers of the neural network, whereas the tracker features are encoded via track encoding layers of the neural network. A temporal fusion of the encoded point features and the encoded tracker features is performed via temporal fusion layers of the neural network. The tracked object is classified based on the fused encoded point and tracker features via classifying layers of the neural network.

20 Claims, 2 Drawing Sheets

(58) Field of Classification Search
CPC .. G01S 13/584; G01S 17/89; G01S 2013/932; G01S 2013/93185; G01S 2013/9319; G01S 2013/9318; G01S 13/589; G01S 17/58; G01S 17/86; G01S 2013/93271; G06N 3/04; G06N 3/044; G06N 3/045; G06N 3/08; G06N 3/084; G06V 20/58; G06V 10/764; G06V 10/82; G06V 10/803; G06V 20/56; G06T 2207/30252; G06T 2207/20084; G06T 2207/30261; G06T 7/246; G06T 2207/10028; G06T 2207/10016

See application file for complete search history.

(56) References Cited

U.S. PATENT DOCUMENTS

| | | | | |
|---|---|---|---|---|
| 11,308,641 | B1* | 4/2022 | Porta | G06T 7/74 |
| 11,327,156 | B2* | 5/2022 | Harrison | G01S 13/867 |
| 11,628,855 | B1* | 4/2023 | Pradhan | G01S 13/589 701/24 |
| 11,774,582 | B2* | 10/2023 | Song | G01S 13/865 342/70 |
| 11,823,461 | B1* | 11/2023 | Song | G01C 21/265 |
| 11,891,036 | B2* | 2/2024 | Costin | B60T 7/22 |
| 11,893,496 | B2* | 2/2024 | Nguyen | G06F 18/217 |
| 2016/0223651 | A1* | 8/2016 | Kamo | G01S 13/426 |
| 2018/0307967 | A1* | 10/2018 | Graf | G01S 7/417 |
| 2019/0204834 | A1* | 7/2019 | Harrison | G06N 3/045 |
| 2020/0118441 | A1* | 4/2020 | Han | G08G 1/161 |
| 2020/0180646 | A1* | 6/2020 | Yoo | G06N 3/08 |
| 2020/0242382 | A1 | 7/2020 | Yin et al. | |
| 2020/0249316 | A1* | 8/2020 | Harrison | G01S 13/931 |
| 2020/0333453 | A1* | 10/2020 | Mende | G01S 7/354 |
| 2020/0333457 | A1* | 10/2020 | Bialer | G01S 7/352 |
| 2021/0063560 | A1* | 3/2021 | Bosse | G01S 13/60 |
| 2021/0156960 | A1* | 5/2021 | Popov | G06T 7/246 |
| 2021/0232833 | A1* | 7/2021 | Nguyen | G06N 3/084 |
| 2021/0255304 | A1* | 8/2021 | Fontijne | G01S 17/931 |
| 2021/0263525 | A1* | 8/2021 | Das | G06V 20/58 |
| 2021/0397885 | A1* | 12/2021 | Sivaraman | G06V 40/28 |
| 2022/0012988 | A1* | 1/2022 | Avadhanam | G08G 1/166 |
| 2022/0048525 | A1* | 2/2022 | Tsai | B60W 50/0098 |
| 2022/0120858 | A1* | 4/2022 | Cennamo | G01S 13/931 |
| 2022/0171975 | A1* | 6/2022 | Derbisz | G06V 10/457 |
| 2022/0172485 | A1* | 6/2022 | Braun | G06V 20/56 |
| 2022/0187441 | A1* | 6/2022 | Bialer | G01S 13/62 |
| 2022/0308205 | A1* | 9/2022 | Roesler | G01S 13/584 |
| 2023/0049567 | A1* | 2/2023 | Popov | G01S 13/865 |
| 2023/0070285 | A1* | 3/2023 | Harrison | G01S 13/931 |
| 2023/0122119 | A1* | 4/2023 | Wu | G05D 1/0289 701/301 |
| 2023/0130478 | A1* | 4/2023 | Zhang | G06T 7/593 382/106 |
| 2023/0184924 | A1* | 6/2023 | Romain | G08B 21/0446 342/179 |
| 2023/0260266 | A1* | 8/2023 | Karasev | G06V 10/82 382/104 |
| 2023/0394682 | A1* | 12/2023 | Yamamoto | G06T 7/277 |

OTHER PUBLICATIONS

"Extended European Search Report", EP Application No. 20212928.4, dated Jun. 4, 2021, 9 pages.

"Gated Recurrent Unit", Retrieved from https://en.wikipedia.org/wiki/Gated_recurrent_unit—on Dec. 9, 2021, 3 pages.

Ouaknine, et al., "CARRADA Dataset: Camera and Automotive Radar with Range-Angle-Doppler Annotations", May 4, 2020, 8 pages.

Schumann, et al., "Semantic Segmentation on Radar Point Clouds", Jul. 2018, pp. 2179-2186.

* cited by examiner

METHOD FOR CLASSIFYING A TRACKED OBJECT

CROSS-REFERENCE TO RELATED APPLICATION

This application claims priority to European Patent Application Number 20212928.4, filed Dec. 10, 2020, the disclosure of which is hereby incorporated by reference in its entirety herein.

BACKGROUND

Modern vehicles are often provided with one or more radar sensors in order to be able to detect and to track an object in the environment of the vehicle. Conventional tracker systems which rely on data provided by the radar sensors of the vehicle can usually provide spatial information of objects only, e.g. information regarding location and velocity of the detected objects.

In an Advanced Driver Assistance System (ADAS) complex decisions need to be made in order to navigate the vehicle properly. For these navigation decisions the spatial information provided by conventional tracker systems is not sufficient. This especially holds true in the field of autonomous driving.

For a reliable navigation based on an ADAS, additional semantic information regarding detected objects is important, i.e. information regarding the type of the detected object. For example, a pedestrian may have a higher priority for performing auto-breaking than some small patches of debris on the road. In such a case, detecting and tracking an object is not sufficient for making a proper decision regarding the navigation of the vehicle.

In an existing ADAS, a simple classification may be applied to the perception of objects. For example, a Bayesian classifier may be used which turned out, however, not to have a reliable performance in some relevant driving situations.

Moreover, neural networks have been proposed for providing a semantic segmentation based on radar point clouds. Although a good performance has been achieved on test data, a deep neural network being used for providing semantic segmentation on radar point clouds requires a complex computation and a high computational effort exceeding the limitations of computer systems which are available in a vehicle. Therefore, providers of passenger cars have mostly refrained so far from implementing such neural networks which are applied to radar detections for semantic segmentation.

Accordingly, there is a need to have a method and a system which are able to provide semantic information for a tracked object in an environment of a vehicle.

SUMMARY

The present disclosure relates to a method for classifying a tracked object in an environment of a vehicle which includes a plurality of radar sensors and a processing device configured to establish a neural network. The present disclosure provides a computer implemented method, a computer system, and a non-transitory computer readable medium and other embodiments according to the claims, the description, and the drawings.

In one aspect, the present disclosure is directed at a computer implemented method for classifying a tracked object in an environment of a vehicle which includes a plurality of radar sensors and a processing device configured to establish a neural network. According to the method, local radar detections are captured from an object in the environment of the vehicle via the radar sensors. Based on the local radar detections, point features and tracker features are determined. The point features are encoded via point encoding layers of the neural network, whereas the tracker features are encoded via track encoding layers of the neural network. A temporal fusion of the encoded point features and the encoded tracker features is performed via temporal fusion layers of the neural network, e.g. by a recurrent neural network. The tracked object is classified based on the fused encoded point and tracker features via classifying layers of the neural network.

Since many modern vehicles are already equipped with radar sensors and devices for processing radar detections and for tracking detected objects, devices, and processing units for determining point features and tracker features may also be available already in such vehicles. Therefore, the method according to the disclosure may easily be implemented in existing systems and merged with existing tracking procedures. Therefore, hardware components may be used for executing the method which are already available on the vehicle, and the method according to the disclosure may therefore be implemented at low cost.

In addition, the neural network is running individually on each track of the detected objects. Therefore, only local radar detections are considered, and no global information of the environment is required for the method. This again reduces the effort and the cost for performing the method according to the disclosure.

The neural network may include fully connected layers, wherein the point encoding layers, the track encoding layers, the temporal fusion layers and the classifying layers may each form a separate group of layers of the neural network. For each group of these layers, a predefined minimum number and a predefined maximum number of layers may be set, for example two to four layers. If there are too many layers, the neural network may not be able to run in real time. On the other hand, if the number of layers is too low, the network may not be able to perform a suitable classification.

Due to the restricted maximum number of layers of the entire neural network, the requirements regarding memory and computational performance are much lower than e.g. for deep neural networks. Therefore, the method according to the disclosure is suitable for an application on standard computational systems of passenger cars.

The point features may comprise a radar cross section of each radar detection, a distance of each radar detection with respect to a track center, i.e. with respect to a centroid of the track, and a compensated Doppler value, i.e. a relative velocity of a respective radar detection with respect to the vehicle, wherein the velocity may be originally determined relative to a respective radar sensor and thereafter compensated for the motion of the vehicle. The point features may be determined for a time sequence of a certain number of subsequent radar detections, e.g. for ten subsequent detections. The tracker features may include a variance of velocity for each track, a length of each track, a velocity for each track in a vehicle coordinate system, a tangential acceleration for each track, a variance of a heading direction for each track, i.e. of the direction of the velocity vector, an absolute value of curvature of each track, and an absolute difference of a pointing direction between two adjacent scans of the track in a world coordinate system.

For classifying the tracked object, classes for objects may be predefined, wherein the classes may be e.g. labeled as "car" (i.e. a small vehicle), "truck/bus" (i.e. a large vehicle), "pedestrian", "motorcycle", "bicycle", and "background" (which refers to unknown objects which may not be cared about). However, the classes are not restricted to these examples, and the predefinition of the classes may be performed flexibly in order to adapt the method to the requirements within the respective vehicle, i.e. within a respective Advanced Driver Assistance System (ADAS).

Due to the classification of the tracked objects, the method is able to provide semantic information regarding the detected objects in addition to the spatial information provided by standard tracking methods. Due to the additional semantic information which may be provided to the Advanced Driver Assistance System of the vehicle, the navigation of the vehicle may be generally improved, especially regarding navigation decisions which are to be taken.

The method may comprise one or more of the following features, as describe below.

The point encoding layers of the neural network may encode each point feature separately and thereafter, a feature pooling may be performed by feature pooling layers of the neural network. The feature pooling may include a maximum pooling or an average pooling.

The temporal fusion layers of the neural network may form a recurrent neural network. The recurrent neural network may be configured as a gated recurrent unit or as a long-short term memory. Each layer of the neural network may include a predefined maximum number of neurons.

A predetermined number of the local radar detections may be sampled before the point features are determined based on local radar detections. Performing the temporal fusion may include performing a hidden state reset.

According to an embodiment, the point encoding layers of the neural network may encode each point feature separately and thereafter, a feature pooling may be performed by feature pooling layers of the neural network. The feature pooling may include a maximum pooling or alternatively an average pooling. Due to the feature pooling, features from different points related to radar detections or from different point features may merged which may support the classification task of the neural network.

The temporal fusion layers of the neural network may form a recurrent neural network (RNN), which may be configured either as gated recurrent unit (GRU) or alternatively as a long-short term memory (LSTM). Since a recurrent neural network (RNN) has connections between paths and connections through time, i.e. feedback, as an intrinsic property, the temporal fusion or fusion of the encoded point and tracker features "over time" may be performed automatically when using a recurrent neural network. The internal feedback of the recurrent neural network may further support the classification task of the method. The gated recurrent unit (GRU) may generally need less parameters than the long-short term memory (LSTM) and may therefore require less memory and computational effort. On the other hand, the long-short term memory (LSTM) may increase the precision and reliability of the neural network and the method.

Each layer of the neural network may include a predefined maximum number of neurons. For example, the maximum number of neurons per layer may be restricted to 256. Due to this restriction, the real-time capability of the neural network and the entire method may be ensured.

A predetermined number of local radar detections may be sampled before the point features are determined based on local radar detections. The predetermined number may be for example ten detections. Due to this minimum number being required for determining the point features, the reliability of the determined point features may be enhanced.

Performing the temporal fusion may include performing a hidden state reset within the neural network. The reset may be performed periodically, e.g. each 20 to 80 radar scans or each one to four seconds. Due to this reset, noise kept in hidden states of the temporal fusion layers may be reduced, which again may enhance the quality of the classification task. However, no reset may be performed as an alternative when performing the temporal fusion of the encoded features.

In another aspect, the present disclosure is directed at a system for classifying a tracked object in the environment of a vehicle. The system includes a plurality of radar sensors configured to capture local radar detections from an object in the environment of the vehicle, a point feature module configured to determine point features based on the local radar detections, a tracker feature module configured to determine tracker features based on the local radar detections, and a processing device configured to establish a neural network. The processing device comprises a point encoding module including point encoding layers of the neural network which encode the point features, a track encoding module including track encoding layers of the neural network which encode the tracker features, a temporal fusion module including temporal fusion layers of the neural network which perform a temporal fusion of the encoded point features and the encoded tracker features, and a classification module including classifying layers of the neural network which classify the tracked object based on the fused encoded point and tracker features.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

In summary, the system according to the disclosure includes the radar sensors, the point feature module, the tracker feature module and the processing device including four further modules which are installed in the vehicle and which are configured to perform the steps as described above for the corresponding method. Therefore, the benefits, the advantages and the disclosure as described above for the method are also valid for the system according to the disclosure.

According to an embodiment, the point encoding module may include additional layers of the neural network which perform a feature pooling. The feature pooling may facilitate the classification of tracked objects. The point feature module may include a flexible list of point features, and the tracker feature module may include a flexible list of tracker features. The system may be adapted to existing and future tracking devices due to the flexible lists of features.

In another aspect, the present disclosure is directed at a computer system, said computer system being configured to carry out several or all steps of the computer implemented method described herein.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM); a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically, in FIG. 1, an overview of a system according to the disclosure, which is included in a vehicle, and in FIG. 2 details of the system and of a method according to the disclosure.

DETAILED DESCRIPTION

Figure 1:
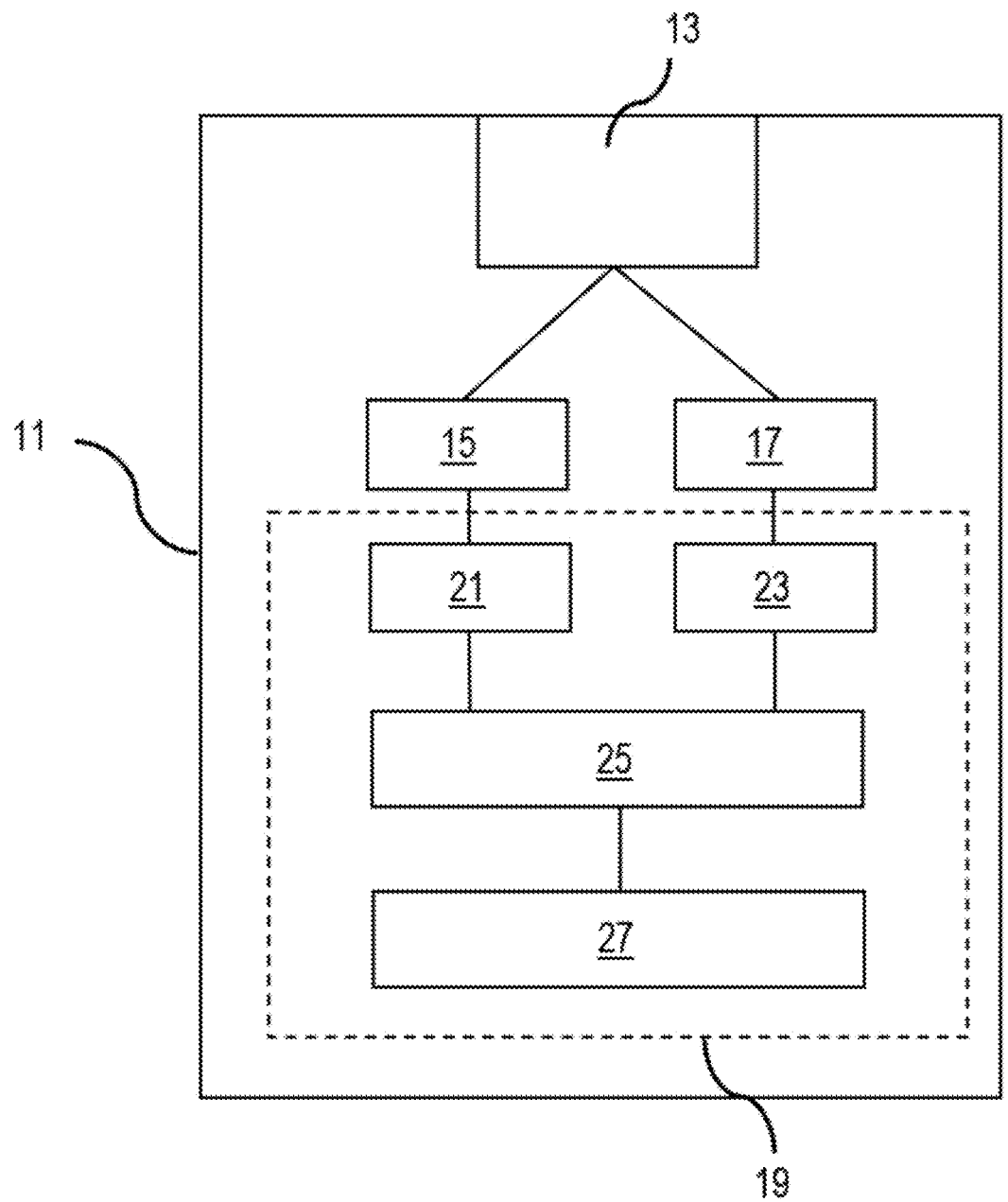

FIG. 1 schematically depicts a vehicle 11 including a plurality of radar sensors 13, a point feature module 15, a tracker feature module 17 and a processing device 19. The radar sensors 13, the point feature module 15 and the tracker feature module 17 may already be incorporated in a known modern vehicle 11 which is equipped with a system configured to track objects in the environment of the vehicle 11.

The processing device 19, however, is configured to perform a method according to the disclosure as described below. Therefore, the processing device 19 includes a point encoding module 21, a track encoding module 23, a temporal fusion module 25 and a classification module 27. By these modules, the processing device 19 is not only able to track objects in the environment of the vehicle 11 spatially, but it is also able to provide semantic information regarding the type of the tracked objects.

The radar sensors 13 include four short range radars. Two of these radars are installed in the front of the vehicle on the left side and on the right side, whereas further two radars are installed in the rear of the vehicle on the left side and on the right side, respectively. However, the use of the system and the method according to the disclosure is not restricted to a radar system including four short range radars. As alternatives, a system including two radars which are installed on the left side and on the right side in the front of the vehicle only or a system including six short range radars (two additional radars in the center of the vehicle on the left and on the right sides, respectively) can be used. In addition, there is no limitation regarding the sensor types used in the radar system. The radar sensors 13 are generally part of a centralized tracking system which can be found in many modern vehicles.

Such a centralized tracking system usually includes the tracker feature module 17 which provides tracker features 18 (see FIG. 2) as output. For the system of the present embodiment, Ft tracker features are provided by the tracker feature module 17, wherein Ft is 7 for the present example. The tracker features 18 include a variance of a velocity of a track (i.e. of an object which is tracked by the radar sensors 13), a length of the track, a velocity of the track in a vehicle coordinate system (VCS), a tangential acceleration of the track, a variance of a heading direction of the track, an absolute value of a curvature of the track, and an absolute difference of a pointing direction between two adjacent scans of the track in a world coordinate system (WCS). The heading direction refers to the direction of a velocity vector of the detected or tracked object. Similarly, the pointing direction refers to an orientation of a body frame of the track, and the absolute difference of the pointing direction refers to such from two adjacent radar scans.

Figure 2:
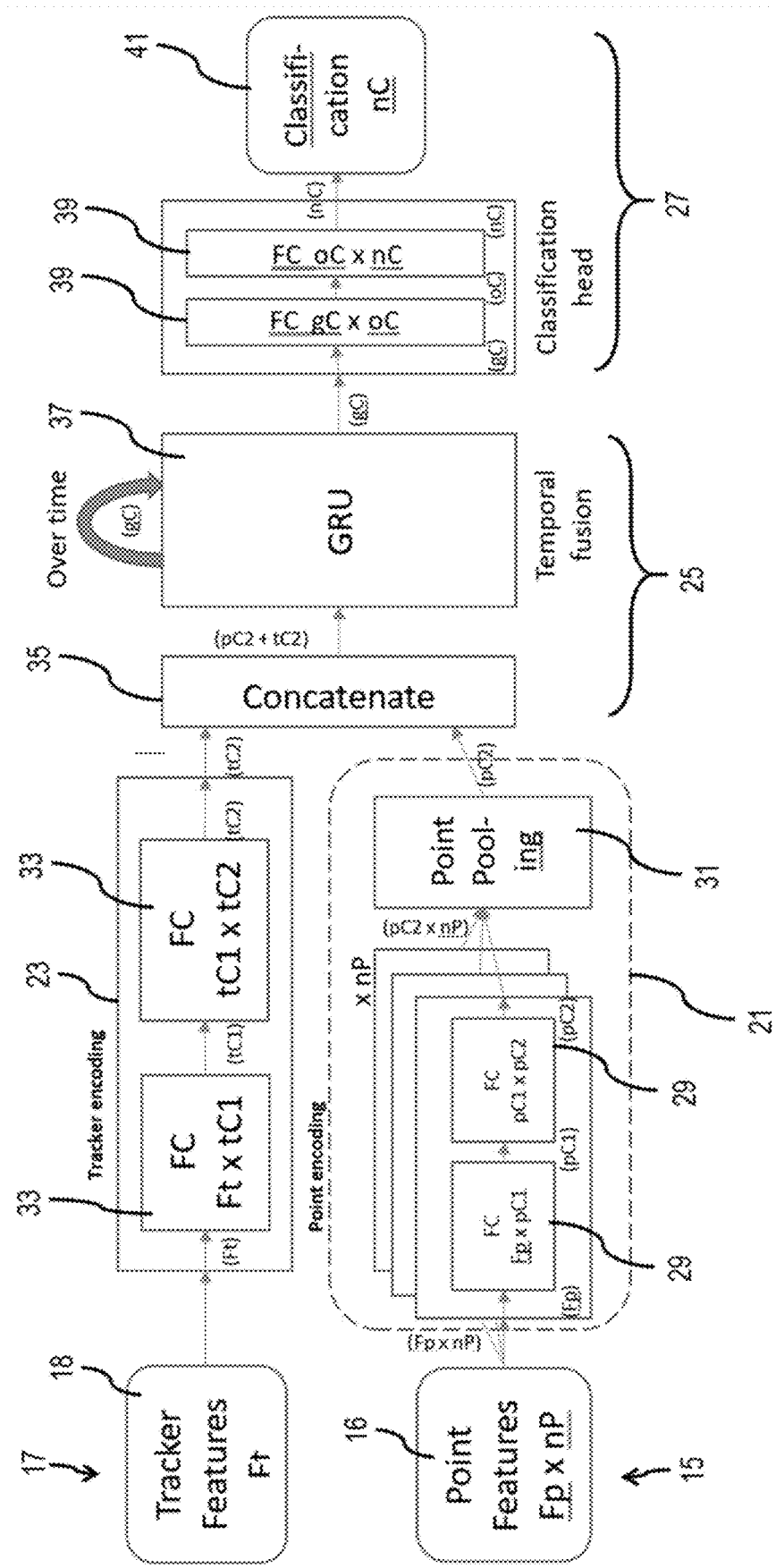

Furthermore, the centralized tracking system of the vehicle 11 includes the point feature module 15 which outputs point features 16 (see FIG. 2). There are Fp point features 16, wherein for present embodiment, Fp is 3 and the point features 16 include a radar cross section (RCS) of a current radar detection of the radar sensors 13, a distance of the detection with respect to a track center (i.e. to the centroid of the track), and a compensated Doppler value, i.e. the relative velocity of the respective detection with respect to the vehicle 11. Actually, the Doppler values are first determined relative to the respective radar sensor and afterwards compensated for the ego-motion of the vehicle 11.

For the present example, each of the three point features 16 is determined for a sequence of ten subsequent detections in order to provide a set of point features 16 as an input for the point feature encoding module 21, i.e. as an output of the point feature module 15. That is, the radar detections of the radar sensors 13 are "upsampled" until the number of measured detections reaches ten.

FIG. 2 depicts the modules of the processing device 19 and the method steps performed by these modules in more detail. The point encoding module 21 and the track encoding module 23 receive the point features 16 and the tracker features 18, respectively, as an input from the point feature module 15 and from the tracker feature module 17, respectively. In detail, Fp×nP point features 16 (i.e. 3×10 for the present embodiment) and Ft tracker features 18 (i.e. seven for the present embodiment) are provided.

The point encoding module 21 includes two fully connected layers 29 of a neural network which are used for point encoding, i.e. applied to each of the point features 16. For the present embodiment, the first of these two layers 29 includes pC1 neurons (pC1=8 for the present example), whereas the second layer includes pC2 neurons for encoding each point feature (pC2=32 for the present example). In the point encoding module 21, each point feature is encoded separately, and therefore the point encoding module 21 includes nP sets of respective pairs of fully connected layers 29 for point encoding, wherein nP is the number of detections to be considered and equal to ten for the present embodiment. Generally, neurons of the fully connected layers include a plurality of weights W and a bias b, as is known in the field of neural networks. That is, the output of the neurons of a layer is obtained by applying a non-linear function on W x+b, wherein x is a respective input vector of the layer which is multiplied by the matrix W of the weights.

Hence, a total number of pC2×nP encoded point features are output by all fully connected layers 29 for point encoding, i.e. a total number of 320 for the present embodiment. These encoded point features are used as an input for further fully connected layers 31 for feature pooling. In detail, a maximum pooling is performed by these layers 31 in order to merge features from different points or point features 16. The mechanism of maximum pooling is known in the art. As an alternative, average pooling can be used. Finally, the point encoding module 21 outputs a number of pC2 encoded point features (pC2=32 for the present example) to which a maximum pooling has been applied.

Similarly, Ft tracker features 18 are encoded (Ft=7 for the present example) by two fully connected layers 33 for tracker encoding. For the present embodiment, the first layer includes tC1=16 neurons, and the second layer includes tC2=32 neurons for performing the tracker encoding. Therefore, the track encoding module 23 outputs tC2 encoded tracker features, i.e. 32 for the present embodiment.

The outputs of the point encoding module 21 and of the track encoding module 23, i.e. the encoded point and tracker features, are provided as an input for the temporal fusion module 25. The temporal fusion module 25 first performs a concatenating step 35 in which the encoded point features and the encoded tracker features are concatenated in order to form a common tensor which is passed to a gated recurrent unit 37 of the temporal fusion module 25.

The gated recurrent unit 37 is a special type of a recurrent neural network (RNN) in which the input information does not simply pass through layer by layer, but in which the information provided as an input is running in loops, and information from former inputs is also considered. That is, in the recurrent neural network information from the immediate past is added to the information from the present which is actually received per layer. Furthermore, gated recurrent unit (GRU) 37 is a similar extension to an RNN as a long-short term memory (LSTM). In addition to the internal feedback of a recurrent neural network, the LSTM includes three gates, an input gate, a forget gate and an output gate. The gated recurrent unit 37 which is used in the present embodiment is similar to a LSTM but lacks an output gate. Therefore, the gated recurrent unit (GRU) 37 has lower requirements regarding memory than a LSTM.

The gated recurrent unit (GRU) 37 includes gC so-called hidden states (gC=32 for the present embodiment) which include the temporal feedback or loops as described above. Therefore, the concatenated input data of the GRU 37 is fused over time, i.e. over the time period for which sampling of the nP=10 detections occurs via the radar sensors 13 (see FIG. 1).

In addition, the temporal fusion module 25 performs a reset of the hidden states of the GRU 37 for every 60 tracker scans, e.g. for every three seconds. These resets are performed in order to avoid an accumulation of noise in the memory of the GRU 37 by setting all hidden states within the GRU 37 to zero. Generally, such a reset may be performed each 20 to 80 scans, e.g. each one to four seconds. The output of the temporal fusion module 25, i.e. of the GRU 37, is provided as an input for the classification module 27.

The classification module 27 includes two fully connected classification layers 39. For the classification module or classification head 27, nC=6 classes are predefined in order to classify the tracked objects. For the vehicle 11, the six classes are labeled "car" (i.e. a small vehicle), "truck/bus" (i.e. a large vehicle), "pedestrian", "motorcycle", "bicycle", and "background" (which refers to unknown objects which may not be cared about). However, the definition of the classes is not restricted to these examples. For the present example, the classification module 27 receives gC=32 input data values, and there are oC=32 neurons of the first layer and nC=6 neurons of the second layer of the classification head. That is, the classification module 27 provides a classification output 41 which relates the track of the detected object to one of the six classes listed above. Therefore, in addition to the spatial information provided by the tracking system semantic information is provided by the method according to the disclosure, i.e. regarding the type of the tracked object.

The method and the system modules as described above are applied to each track (i.e. to each detected object) separately. However, the method and the system may be applied to a plurality of tracks and objects in the environment of the vehicle 11 at the same time. Besides, the system and the method according to the disclosure require a small number of layers for the total neural network and a small number of neurons per layer. Therefore, the system of the present disclosure may be regarded as "light-weighted" and is therefore suitable for running on an electronic control unit (ECU) of a passenger car, e.g. on an Aurix-platform.

What is claimed is:

1. A method comprising:
classifying a tracked object in an environment of a vehicle that has a plurality of radar sensors in addition to a processing device configured to establish a neural network, classifying the tracked object comprising:
capturing local radar detections from an object in the environment of the vehicle via the radar sensors;
determining point features based on the local radar detections;
determining tracker features based on the local radar detections;
encoding the point features via point encoding layers of the neural network;
encoding the tracker features via track encoding layers of the neural network;
concatenating the encoded point features and the encoded tracker features to form a common tensor;
passing the common tensor to a recurrent neural network which provides temporal fusion layers of the neural network to perform a temporal fusion of the encoded point features and the encoded tracker features via the temporal fusion layers; and
classifying the tracked object based on the fused encoded point and tracker features via classifying layers of the neural network.

2. The method according to claim 1, further comprising:
encoding each point feature for the point encoding layers of the neural network separately; and
feature pooling the point encoding layers of the neural network.

3. The method according to claim 2, wherein feature pooling includes performing a maximum pooling.

4. The method according to claim 2, wherein feature pooling includes performing an average pooling.

5. The method according to claim 1, wherein the recurrent neural network is configured as a gated recurrent unit.

6. The method according to claim 1, wherein the recurrent neural network is configured as a long-short term memory.

7. The method according to claim 1, wherein each layer of the neural network includes a predefined maximum number of neurons.

8. The method according to claim 1, further comprising:
sampling a predetermined number of the local radar detections before determining the point features based on local radar detections.

9. The method according to claim 1, wherein performing the temporal fusion includes performing a hidden state reset.

10. The method according to claim 1, wherein the point features comprise a flexible list of point features.

11. The method according to claim 1, wherein the tracker features comprise a flexible list of tracker features.

12. A system comprising:
a computer system for a vehicle including a plurality of radar sensors and a processor, the processor configured to execute a neural network to classify a tracked object in an environment of the vehicle by:
capturing local radar detections from an object in the environment of the vehicle via the radar sensors;
determining point features based on the local radar detections;
determining tracker features based on the local radar detections;
encoding the point features via point encoding layers of the neural network;
encoding the tracker features via track encoding layers of the neural network;
concatenating the encoded point features and the encoded tracker features to form a common tensor;
passing the common tensor to a recurrent neural network which provides temporal fusion layers of the neural network to perform a temporal fusion of the encoded point features and the encoded tracker features via the temporal fusion layers; and
classifying the tracked object based on the fused encoded point and tracker features via classifying layers of the neural network.

13. The system according to claim 12, further comprising:
encoding each point feature for the point encoding layers of the neural network separately; and
feature pooling the point encoding layers of the neural network.

14. The system according to claim 13, wherein feature pooling includes performing a maximum pooling.

15. The system according to claim 13, wherein feature pooling includes performing an average pooling.

16. The system according to claim 12, wherein the recurrent neural network is configured as a gated recurrent unit.

17. The system according to claim 12, wherein the recurrent neural network is configured as a long-short term memory.

18. The system according to claim 12, wherein each layer of the neural network includes a predefined maximum number of neurons.

19. The system according to claim 12, further comprising:
sampling a predetermined number of the local radar detections before determining the point features based on local radar detections.

20. A non-transitory computer readable medium comprising instructions that when executed by a processor of a vehicle having a plurality of radar sensors, configure the processor to execute a neural network to track an object in an environment of the vehicle by:
capturing local radar detections from an object in the environment of the vehicle via the radar sensors;
determining point features based on the local radar detections;
determining tracker features based on the local radar detections;
encoding the point features via point encoding layers of the neural network;
encoding the tracker features via track encoding layers of the neural network;
concatenating the encoded point features and the encoded tracker features to form a common tensor;
passing the common tensor to a recurrent neural network which provides temporal fusion layers of the neural network to perform a temporal fusion of the encoded point features and the encoded tracker features via the temporal fusion layers; and
classifying the tracked object based on the fused encoded point and tracker features via classifying layers of the neural network.

\* \* \* \* \*